United States Patent
Fox

(10) Patent No.: US 7,132,160 B2
(45) Date of Patent: Nov. 7, 2006

(54) LAMINATE TAPE

(75) Inventor: Gary D. Fox, Racine, WI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 182 days.

(21) Appl. No.: 10/900,719

(22) Filed: Jul. 27, 2004

(65) Prior Publication Data

US 2005/0025961 A1 Feb. 3, 2005

Related U.S. Application Data

(60) Provisional application No. 60/490,612, filed on Jul. 28, 2003.

(51) Int. Cl.
*D06N 7/04* (2006.01)
*B32B 7/12* (2006.01)

(52) U.S. Cl. ............... 428/356; 428/489; 428/493; 428/343; 138/129; 138/137; 138/140; 138/141; 138/144

(58) Field of Classification Search ............... 428/489, 428/493, 343, 356; 138/129, 137, 140, 141, 138/144
See application file for complete search history.

(56) References Cited

U.S. PATENT DOCUMENTS

| 4,755,545 | A | * | 7/1988 | Lalwani | 524/64 |
| 4,876,130 | A | * | 10/1989 | Vonk et al. | 428/40.3 |
| 5,028,487 | A | * | 7/1991 | Kindt et al. | 428/489 |
| 5,712,038 | A |   | 1/1998 | Yamazaki et al. |  |
| 2005/0025961 | A1 | * | 2/2005 | Fox | 428/356 |

* cited by examiner

*Primary Examiner*—Daniel Zirker
(74) *Attorney, Agent, or Firm*—Stephen D. Harper

(57) ABSTRACT

A laminate tape useful for insulating pipes, lines and the like is constructed of a tacky first layer containing asphalt and an insulative filler such as granulated cork adhered to a flexible second layer that is less tacky. The flexible second layer contains a rubber such as butyl rubber.

14 Claims, 1 Drawing Sheet

LAMINATE TAPE

CROSS-REFERENCE TO RELATED APPLICATIONS

This application claims priority from U.S. Provisional Application Ser. No. 60/490,612, filed 28 Jul. 2003 and incorporated herein by reference in its entirety.

FIELD OF THE INVENTION

This invention provides a laminate tape useful for application to substrates such as HVAC components and connectors for purposes of forming an insulating covering on such substrates.

BACKGROUND OF THE INVENTION

Asphaltic compositions have found wide acceptance as protective coatings and sealants for many different types of surfaces. For example, asphaltic compositions have been utilized to protect metallic substrates and the like from the effects of weather, water, and corrosive vapors while also insulating such substrate surfaces. However, asphaltic compositions are typically quite sticky at room temperature and thus can be difficult to apply to the substrate without transferring portions of such compositions to the hands of the person applying the composition or to the tool used to apply the composition. Once in place, the coating formed from the asphaltic composition generally retains a sticky, soft outer surface that can be difficult to handle cleanly and which is prone to being contaminated by dirt and other debris. It would therefore be desirable to develop products capable of forming a protective, insulative coating of an asphaltic composition on a substrate surface without the aforementioned difficulties.

BRIEF SUMMARY OF THE INVENTION

The laminate tape of the invention is comprised of a tacky layer and a second layer wherein one side of the tacky layer is adhered to one side of the second layer and the tackiness of the second layer is less than that of the first layer. Thus, one exposed side of the laminate tape is tacky at room temperature, while the other exposed side is reduced in tackiness (or in certain embodiments of the invention may be essentially non-tacky). When applied to a substrate surface, the laminate tape acts as a thermal barrier (i.e., has an insulative or insulating effect) and is capable of sealing joints, pipes, conduits, ducts and the like against condensed liquids such as water. The laminate tape may be easily wrapped, bent, or stretched and, due to the tackiness of the tacky layer, readily adheres to the substrate surface. Application of the laminate tape is also facilitated by the reduced tackiness of the surface of the second layer, which minimizes transfer of the tacky layer or adherence of contaminants such as dirt and the like to the exposed surface of the laminate tape once applied to the substrate surface.

DETAILED DESCRIPTION OF CERTAIN EMBODIMENTS OF THE INVENTION

Figure 1:
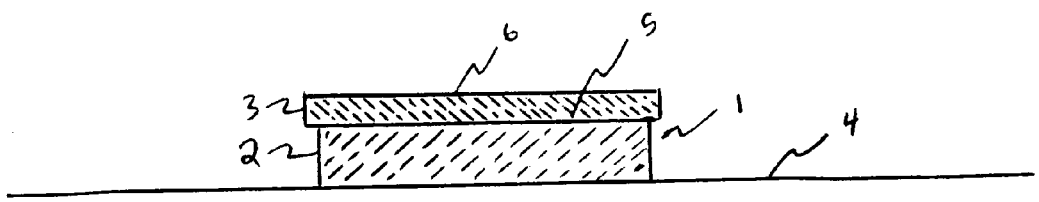
FIG. 1 is a cross-section of an illustrative embodiment of the laminate tape of the invention.

The tacky layer is preferably comprised of asphalt and at least one thermally insulative filler. The asphalt used may be any of the known bituminous substances derived from hydrocarbon sources such as petroleum, shale oil, coal tar and the like. As is well known in the art, asphalt is a complex mixture, generally solid or semi-solid in consistency, of different compounds such as relatively major amounts of paraffinic, cycloaliphatic and aromatic hydrocarbons and relatively minor amounts of heterocyclic compounds. While asphalt may be obtained from natural sources, it is generally produced commercially as a by-product of crude oil refining or distillation (for example, as the bottom fraction or residue of crude oil distillation). Oxidized asphalts (also known as blown asphalts) are particularly suitable for use. While the particular type of asphalt used in the present invention is not believed to be particularly critical, it will generally be desirable to select an asphalt that is sufficiently soft so as to impart the desired degree of tackiness to the tacky layer. The tackiness of the tacky layer can assist in both adhering the laminate tape of the invention to a substrate surface and adhering the tacky layer to the second, less tacky layer (so that, for example, the two layers do not separate or delaminate during normal use). At the same time, the asphalt preferably is sufficiently hard that the tacky layer prepared therefrom generally retains its shape at room temperature in the absence of applied forces other than gravity (i.e., is dimensionally stable). However, the tackiness and other physical characteristics of the tacky layer may also be easily controlled by incorporating various additives into the tacky layer. For example, if a relatively hard, non-tacky asphalt is utilized, the tackiness, softness and/or flexibility of the tacky layer prepared therefrom may be increased by additionally incorporating one or more tackifiers and/or extender oils and/or plasticizers. If a relatively soft, flowable asphalt is utilized, the tendency of the resulting tacky layer to be incapable of retaining a stable dimensional form in the absence of forces other than gravity may be avoided by incorporating a relatively high level of fillers and/or rheological agents (thickeners) into the tacky layer. In one embodiment of the invention, the tacky layer exhibits a needle penetration value (as measured by ASTM D1321; 100 g total load; 23 degrees C.±2 degrees C.) of from about 2.5 to about 6. In another embodiment, the needle penetration value of the tacky layer is from about 3.5 to about 5. Although preferably the tacky layer itself inherently possesses the desired degree of tackiness, in one embodiment of the invention a coating of a pressure sensitive adhesive is applied to the surface of the tacky layer that is to be brought into contact with the substrate surface in order to enhance the adhesion of the laminate tape to the substrate surface. Similarly, an adhesive could be used to join the tacky layer to the second, less tacky layer during fabrication of the laminate tape.

The filler preferably is a material having relatively low thermal conductivity. Low density, lightweight fillers are generally preferred. Cork is a preferred thermally insulative filler, with granulated cork or cork in other particulate forms being especially preferred. The insulative filler may be inorganic or organic in character, but preferably is in particulate form. For example, other suitable insulative fillers include vermiculite (such as expanded vermiculite), perlite, lava rock, fly ash, pumice, silica, glass and ceramic fibers, powder or beads (including hollow spheres), mica, alumina, slag cinders, talc, cellulosic materials and the like.

The tacky layer may additionally be comprised of one or more rubbers such as polybutene or an isoprene polymer or copolymer. In one embodiment of the invention, the tacky layer is comprised of about 30 to about 60 weight percent asphalt, about 10 to about 60 weight percent rubber, and about 10 to about 50 weight percent thermally insulative filler. The formulation for the tacky layer is preferably selected so that the tacky layer is sufficiently tacky to remain adhered at room temperature when pressed into place against a substrate surface and is also dimensionally stable at room temperature.

The second layer is comprised of a rubber (sometimes referred to in the art as an elastomer) and is lower in tack than the tacky first layer. In preferred embodiments of the invention, the second layer is essentially free of any tack at room temperature and does not contain any components which transfer to a user's fingers when being handled or applied to a substrate surface. One or more different rubbers may be utilized; the rubber may be thermoplastic or thermosettable (i.e., capable of being vulcanized). Butyl rubber is an especially preferred rubber, but other rubbers such as natural rubber, isoprene rubber, butadiene rubber, chloroprene rubber, isobutylene-isoprene rubber, nitrile-butadiene rubber, styrene-butadiene rubber, ethylene-propylene copolymer rubber, and/or ethylene-propylene-diene terpolymer rubber could, for example, also be used. Any or all of these materials may also be used as the optional rubber component in the tacky layer. In addition to rubber, the second layer may be additionally comprised of other conventional rubber components such as, for example, fillers, plasticizers/processing oils, blowing agents, curatives, colorants, stabilizers, waxes and the like. The second layer should be formulated so as to provide a tape laminate that is flexible and capable of being readily curved, bent or otherwise conformed to a substrate surface. In one embodiment of the invention, the second layer is comprised of about 1 to about 10 weight percent butyl rubber, about 20 to about 80 weight percent filler (e.g., talc and/or limestone in finely divided or powder form), and about 10 to about 30 weight percent of a plasticizer/processing oil (e.g., a dialkyl phthalate). TEROSTAT 65-1027, sold by the Technologies division of Henkel Corporation, is an example of a material suitable for use as the second layer. In one embodiment of the invention, the needle penetration value of the second layer (as measured by ASTM D1321; 50 g total load; 23±2 degrees C.; 5 seconds) is from about 3 to about 20. In another embodiment, the needle penetration value of the second layer is from about 5 to about 15.

The components comprising the laminate tape of the present invention should be selected such that the tape is flexible and capable of being readily curved, bent, or otherwise conformed to a substrate surface. The use of relatively stiff materials such as polyethylene to construct the second layer thus is to be avoided, as the resulting tape would be more difficult to apply and will tend to separate from the substrate surface (especially one that has a high degree of curvature or small diameter or which contains sharp angles). In one embodiment of the invention, the laminate tape is constructed such that at room temperature it is completely conformable to a substrate surface containing a 90 degree angle upon application by hand using normal finger pressure and remains in such conformance indefinitely after release of such pressure. In another embodiment, the tacky layer and the second less tacky layer are selected and formulated such that each layer passes a flexibility test at 23 degrees C. (±2 degrees C.) involving a 180 degree bend and a 6.4 mm mandrel.

The laminate tape may be prepared by any suitable method, but coextrusion is an especially convenient and preferred method. Conventional coextrusion techniques may be employed whereby the material used to form the tacky first layer and the material used to form the second layer are extruded simultaneously through a single die. To facilitate the coextrusion process, the materials used may each be heated to a temperature above ambient temperature with the coextruded laminate thereby obtained then being cooled to ambient temperature. The coextrusion may be carried out such that a laminate is obtained which is wider than the tape which is desired, with the laminate being cut by conventional slitting methods to provide the finished laminate tape.

The dimensions of the laminate tape may be readily varied as may be desired to suit a particular end-use application. Generally speaking, however, the tacky first layer will preferably have a thickness of from about 0.05 inches to about 0.25 inches and the second layer will have a thickness of from about 0.02 inches to about 0.15 inches. Typically, the thickness of the second layer will be no greater than the thickness of the tacky first layer. The width of the laminate tape usually will be from about 1.5 inches to about 3.5 inches. The tacky first layer and said second layer are usually substantially equal in width, but in certain embodiments of the invention the second layer to slightly overhangs the tacky first layer on each side. For example, about 0.05 inches to about 0.15 inches of overhang may exist. The width of the second layer thus may be from about 100% to about 120% the width of the tacky first layer. There is no particular limitation on the length of the laminate tape, as this will depend upon the application that the tape is to be used in. The laminate tape length therefore may vary from a few inches to many feet in length (e.g., from about 4 inches to about 100 feet). Longer lengths of the laminate tape may be handled in the form of rolls where the tape is wound upon itself (starting with a central hollow core, for example) and the tape then unwound and cut to size as needed. To facilitate this process, the outer surface of the second layer may be treated with a substance to enable the outer surface of the tacky first layer to be cleanly separated from the second layer outer surface. A release paper or film (for example, silicone-coated paper) could alternatively be used for this purpose, wherein the release paper or film could be substantially equal in width to the tacky layer and the second layer.

FIG. 1 shows (in cross-section) an embodiment of the laminate tape of the present invention. Laminate tape 1 is comprised of tacky first layer 2 and second layer 3 and is shown applied (adhered) to substrate surface 4. In one embodiment of the invention, the substrate surface is comprised of a metal such as steel, aluminum or the like. The bottom surface of second layer 3 is attached to the top surface of tacky first layer 2 at interface 5, relying on the tackiness of first layer 2. The edges of second layer 3 slightly overhang the edges of tacky first layer 2 on each side. The top surface 6 of second layer 3 is less tacky than the surfaces of first layer 2, thereby allowing the laminate tape 1 to be easily and conveniently positioned as desired on substrate surface 4 by applying the laminate tape 1 to substrate surface 4 and pressing against surface 6 of second layer 3. As surface 6 is reduced in tack as compared to the surfaces of first layer 2, little or no transfer of material to the instrument or hand used to apply such pressure takes place. Additionally, the laminate tape 1 is protected against the accumulation of dirt and other debris by the second layer 3. In one embodiment of the invention, a plurality of strips of the laminate tape are applied side-by-side onto the substrate surface such that the outer edges of the second layers in adjacent laminate tape strips abut each other. Where the substrate is elongated in shape (such as a pipe or conduit, for example) the laminate tape may be wrapped around the substrate in a spiral or helical manner. The entire substrate surface can thereby be insulated and/or sealed against water condensation and corrosion.

The laminate tape of the present invention is especially suitable for use in cooperation with substrate surfaces, particularly metallic substrate surfaces, where the substrate surface is typically at a temperature that is significantly higher or lower than ambient (room) temperature as a result of a hot or cold gas or liquid being in contact with one side of the substrate. For example, a component of a heating, ventilation, and air conditioning (HVAC) unit may contain a cold refrigerant when the HVAC unit is in operation. The refrigerant cools the outer surface of the component, thereby reducing its temperature below room temperature and making the outer surface susceptible to condensation of moisture from the air. Additionally, the relatively warm air surrounding the component will tend to transfer heat to the substrate surface and the refrigerant inside, thereby reducing the efficiency of the HVAC unit. When the laminate tape of the present invention is applied to the outer surface of the HVAC unit component, the outer surface is effectively insulated and also protected against moisture condensation. The invention described herein is particularly useful for application to automotive HVAC units and components thereof, such as, for example, pipes, lines, conduits, joints, and the like.

What is claimed is:

1. A method of insulating a component of a heating, ventilation, and air conditioning unit wherein said component comprises a metallic substrate having an outer surface and having another surface which is in contact with a hot or cold gas or liquid, said method comprising:
   a). providing a laminate tape comprised of i) a tacky first layer comprised of asphalt, rubber, and particulate cork filler and having a thickness of from about 0.05 inches to about 0.25 inches and b) a second layer which is essentially non-tacky and comprised of a rubber, said second layer having a thickness of from about 0.02 inches to about 0.15 inches and being no greater in thickness than said tacky first layer, wherein one side of said tacky first layer is adhered to one side of said second layer, the width of said second layer is from about 100% to about 120% the width of said tacky first layer, and said tacky first layer and said second layer each have a width of from about 1.5 inches to about 3.5 inches; and
   b). pressing said tacky first layer of the laminate tape against said outer surface of said metallic substrate to conform and adhere said laminate tape to said outer surface.

2. The method of claim 1, wherein said component is elongated and the laminate tape is wrapped around said component in a spiral or helical manner.

3. The method of claim 1, wherein strips of said laminate tape are applied side-by-side onto said outer surface in a manner such that the outer edges of the second layers in adjacent strips abut each other.

4. The method of claim 1, wherein said outer surface is curved or contains a sharp angle.

5. The method of claim 1, wherein said component is selected from the group consisting of pipes, conduits, ducts, and joints.

6. The method of claim 1, wherein said component is an automotive component.

7. The method of claim 1, wherein said second layer is comprised of butyl rubber.

8. The method of claim 1, wherein said laminate tape has been produced by coextrusion.

9. The method of claim 1, wherein said second layer is comprised of from about 1 to about 10 weight percent butyl rubber, about 20 to about 80 weight percent filler, and about 10 to about 30 weight percent plasticizer/processing oil.

10. The method of claim 1, wherein said component contains a refrigerant.

11. The method of claim 1, wherein said tacky first layer is comprised of about 30 to about 60 weight percent asphalt, about 10 to about 60 weight percent rubber, and about 10 to about 50 weight percent particulate cork filler.

12. The method of claim 1, wherein the second layer has a needle penetration value (ASTM D1321; 50 g total load; 23±2 degrees C.; 5 seconds) of from about 3 to about 20.

13. The method of claim 1, wherein said laminate tape is completely conformable at room temperature to a substrate surface containing a 90 degree angle upon application by hand using normal finger pressure and remains in such conformance indefinitely upon release of such pressure.

14. The method of claim 1, wherein said tacky first layer has a needle penetration value (ASTM D1321; 100 g total load; 23±2 degrees C; 5 seconds) of from about 2.5 to about 6.

* * * * *